P. A. Thayer.
Revolving Rake.

No. 95,164.  Patented Sep. 21, 1869.

Witnesses.
P. T. Dodge
L. Hailee

Inventor,
P. A. Thayer
by Dodge & Munn
his atty.

United States Patent Office.

PARKER A. THAYER, OF THERESA, NEW YORK.

Letters Patent No. 95,164, dated September 21, 1869.

---

IMPROVEMENT IN HORSE-RAKES.

---

The Schedule referred to in these Letters Patent and making part of the same.

---

*To all whom it may concern:*

Be it known that I, PARKER A. THAYER, of Theresa, in the county of Jefferson, and State of New York, have invented certain new and useful Improvements in Revolving Horse Hay-Rakes; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to revolving horse hay-rakes, and consists in the construction and arrangement of certain novel adjustable devices for regulating the angle or position of the teeth of the rake, and allowing it to revolve, as desired.

In the drawings—

In constructing my rake, I make a frame, A, consisting of the uprights a, cross-piece b, and side pieces c, the latter forming the shafts for attaching the horse, if desired, and of any size desired, and out of any suitable material.

To the lower ends of the uprights a, I attach a rake, B, by metal straps or loops, d, or other suitable devices, and in such a way as to allow the rake to turn easily in its connections, and to the rear side of the uprights, near their lower ends, hinge, by an eye-bolt and staple, or by any other device desired, the handles C, all as clearly shown in both figures.

Figure 2:
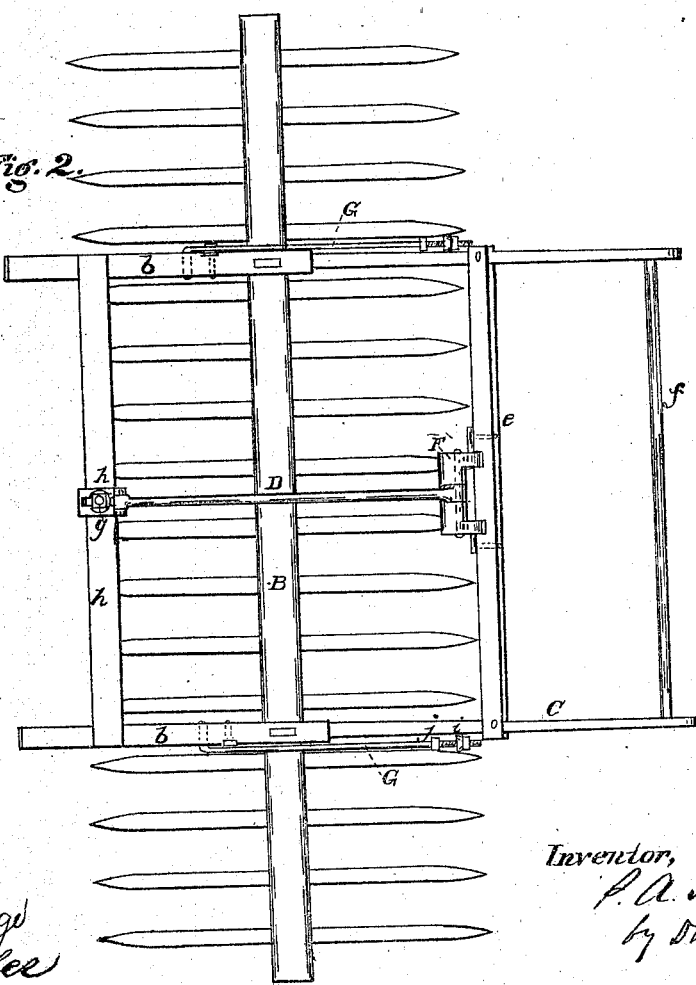
Figure 2 is a top plan view.

These handles C, I provide, near their centres, with a cross-bar, e, and near their ends, with connecting-rod or bar f, as shown in fig. 2.

To the cross-piece c, of the frame A, and near its centre, I connect a pitman, D, by means of a bolt, g, passing through a slotted_iron, h, hinged to the pitman D, as clearly shown in fig. 2.

Figure 1:
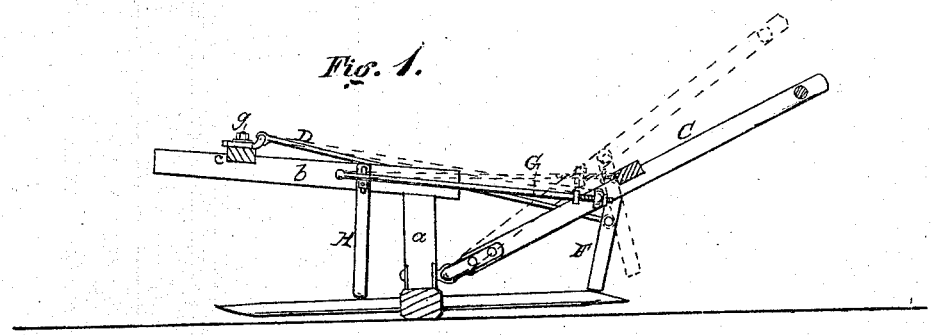
Figure 1 is a side or end view.

The opposite end of the pitman D, I hinge or connect loosely to a suspended brace, F, and at a short distance below its point or points of suspension, as shown in figs. 1 and 2.

This brace F, I make sufficiently broad to bear against two or more of the teeth of the rake at the same time, and suspend it from the cross-piece e by means of metallic loops passing about a rod bolted or fastened to the cross-piece, as shown in fig. 2.

To the outer sides of the side pieces b, of the frame A, I connect loosely extension-rods G at one end, and the opposite ends of these rods I pass through eye-bolts i, having first provided them with a screw-thread and screwed thereon the nut j. After they are passed through these eye-bolts, I place on another nut, k, as shown in both figures.

These nuts i and k can be readily adjusted at different distances apart, so as to allow the rods G to be shortened or lengthened, as desired, and also to have a longitudinal movement equal to the distance between the nuts.

Also, to the outer sides of the side pieces b, I attach vertical steel springs, H, by means of a bolt passing through a slot in their upper ends. The lower ends of these springs are bent at right angles inwardly, and are so arranged as to bear against the upper side of the teeth of the rake, as shown in fig. 1, and thus prevent the rake from turning only in one direction.

By this construction, it will be seen that the pitman D and steel springs H may be conveniently lengthened or shortened by means of their slotted connections, as desired, and that the extension-rods G, at the sides, are not only susceptible of being lengthened or shortened, but may also be given any desired play longitudinally, which function is essential to the operation of my rake.

In operating it, I adjust the springs, pitman, and extension-rods, so as to give any angle or pitch that may be desired to the teeth, to suit the work to be done. To increase the pitch, the springs should be lengthened, and the pitman and extension-rods shortened, while the reverse of this is required to diminish it. At the same time I fix the distance between the nuts j and k, so as to allow the handles C to be raised just far enough for the pitman D to throw or swing the brace E clear of the teeth of the rake as it revolves.

When all the parts are properly adjusted, the rake is drawn along as far as desired, then, by simply elevating the handles, the brace is thrown clear of the teeth, and the rake is free to revolve and deposit its load. By dropping the handles, it is caught again between the springs and the brace, and ready for operation again, and so on till the work is completed.

Having thus described my invention,

What I claim, is—

1. The combination of the frame A, rake B, and handles C with the springs H, pitman D, and extension-rods G, when the same are all constructed and arranged to be adjustable, and operate in the manner substantially as described, and for the purpose set forth.

2. Providing the rods G with the nuts j and k, to adjust the length of the rods, and to regulate their longitudinal movement, substantially as herein described, and for the purpose set forth.

3. The adjustable slotted iron h, when constructed and arranged as described, and for the purpose set forth.

PARKER A. THAYER.

Witnesses:
WILLIAM DRYSON,
M. OYSTUR.